(12) United States Patent
Deng et al.

(10) Patent No.: US 7,385,955 B2
(45) Date of Patent: Jun. 10, 2008

(54) COMMUNICATION SYSTEM, SIGNAL PRE-PROCESSING APPARATUS AND SIGNAL RECEIVING APPARATUS THEREOF

(75) Inventors: Juinn-Horng Deng, Longtan Township, Taoyuan County (TW); Ta-Sung Lee, Hsinchu (TW); Fu-Yen Kuo, Hsinchu (TW)

(73) Assignee: Qisda Corporation, Taoyuan (TW)

( * ) Notice: Subject to any disclaimer, the term of this patent is extended or adjusted under 35 U.S.C. 154(b) by 822 days.

(21) Appl. No.: 10/828,007

(22) Filed: Apr. 20, 2004

(65) Prior Publication Data
US 2004/0213196 A1  Oct. 28, 2004

(30) Foreign Application Priority Data
Apr. 24, 2003  (TW) ............................... 92109582 A

(51) Int. Cl.
*H04B 7/216* (2006.01)
(52) U.S. Cl. ....................... 370/335; 370/342
(58) Field of Classification Search ..................... None
See application file for complete search history.

(56) References Cited

U.S. PATENT DOCUMENTS 6,122,260 A    9/2000  Liu et al.
6,185,440 B1   2/2001  Barratt et al.
6,351,499 B1   2/2002  Paulraj et al.
6,377,812 B1   4/2002  Rashid-Farrokhi et al.
2003/0016640 A1* 1/2003 Onggosanusi et al. ...... 370/335
2003/0072285 A1* 4/2003 Onggosanusi et al. ...... 370/335
2003/0147343 A1* 8/2003 Onggosanusi et al. ...... 370/209

* cited by examiner

*Primary Examiner*—Chau Nguyen
*Assistant Examiner*—Kenneth R Hartmann
(74) *Attorney, Agent, or Firm*—Snell & Wilmer L.L.P.

(57) ABSTRACT

The present invention provides a communication system, signal pre-processing apparatus and signal receiving apparatus thereof. The signal pre-processing apparatus is used for pre-processing signals before they are transmitted by a plurality of antennas. The apparatus includes a serial-to-parallel converter, L compensation processors and L beam formation processors. First of all, the serial-to-parallel converter converts a digital signal into N divided signals. Each of the compensation processors pre-compensates the N divided signals and outputs a compensated signal. Each of the beam formation processors intensifies the compensated signal and outputs an intensified signal. Each of the antennas combines L intensified signals into a particular signal, and meanwhile, upconverts the particular signal into a RF (radio-frequency) signal for transmission.

17 Claims, 3 Drawing Sheets

COMMUNICATION SYSTEM, SIGNAL PRE-PROCESSING APPARATUS AND SIGNAL RECEIVING APPARATUS THEREOF

CROSS-REFERENCE TO RELATED APPLICATION

This Application claims priority to Taiwan Patent Application No. 092109582 filed on Apr. 24, 2003.

FIELD OF THE INVENTION

The present invention relates to a signal pre-processing apparatus and a signal receiving apparatus thereof applied to communication systems.

BACKGROUND OF THE INVENTION

The communication infrastructure of future wireless services will involve high-speed networks, central base stations, and various nomadic mobile units of different complexity that must interoperate seamlessly. In addition to standard issues such as capability and affordability, a mobile wireless network also emphasizes survivability against fading and interference, system flexibility and robustness, and fast access. To achieve the above targets, the complexity of signal access apparatuses and the cost of production have risen sharply.

Therefore, a signal access apparatus that reduces cost and apparatus complexity is required.

SUMMARY OF THE INVENTION

An aspect of the present invention is to provide a signal pre-processing apparatus used in wireless communication systems. It is configured to pre-compensate signal attenuation, delay and phase shift during transmission. It is also configured to intensify the signal to maintain communication quality.

The other aspect of the present invention is to provide a signal receiving apparatus such as a mobile device. The signal receiving apparatus combines the function of a RAKE receiver so that the structure of the receiver end in a communication system can be simplified.

The signal pre-processing apparatus of the present invention includes a serial-to-parallel converter, L compensation processors, and L beam formation processors. The serial-to-parallel converter is configured to convert a digital signal into N divided signals. Each of the compensation processors receives and makes operation of the N divided signals in response to one channel parameter to pre-compensate channel attenuation, provides a time delay compensation in response to one time parameter, and finally generates a compensated signal. Each of the beam formation processors, corresponding to one of the compensation processors, is configured to receive and intensify the compensated signal to generate an intensified signal in response to one beam parameter. Hence, the L beam formation processors generate in total L intensified signals. The signal pre-processing apparatus further includes J transmission antennas. Each of the transmission antennas is configured to receive the L intensified signals and includes a signal combination device and an upconverter. The signal combination device is configured to combine the L intensified signals into a particular signal. The upconverter is configured to upconvert the particular signal into a radio-frequency signal. The J transmission antennas generate and transmit J radio-frequency signals in total.

The present invention also discloses a signal receiving apparatus for receiving the J radio-frequency signals. The signal receiving apparatus includes a receiving antenna, N spreading code match filters, N determination devices, and a parallel-to-serial converter. The receiving antenna is configured to receive and downconvert the J radio-frequency signals into J baseband signals. Each of the N spreading code match filters is configured to receive and multiply the J baseband signals by one of the spreading codes, and then to filter the results to obtain a main signal. Therefore, the N spreading code match filters obtain N main signals in total. Each of the N determination devices, corresponding to one of the N spreading code match filters, is configured to determine a value of the corresponding main signal. The parallel-to-serial converter is configured to convert the N main signals into the digital signal in response to the values of the N main signals. The present invention can be applied to a code division multiple access (CDMA) system. In addition to the signal pre-processing apparatus mentioned above, the CDMA system further includes a stationary device and a mobile device. The stationary device has a parameter generator and a transmitter. The parameter generator is configured to receive a signal from uplink and derive compensation parameters associated with the channel parameters and the beam parameters. The transmitter, including the J transmission antennas, is configured to transmit the modified digital signal. The mobile device, including the signal receiving apparatus, is configured to receive and restore the digital signal.

DETAILED DESCRIPTION

The present invention provides a signal pre-processing apparatus and a signal receiving apparatus applied to communication systems. Since the channel characteristics of the uplink and downlink are identical, the signal pre-processing apparatus can estimate possible loss, such as signal attenuation, delay and phase shift, in the downlink channel and pre-compensate according to the uplink channel characteristics. The signal pre-processing apparatus compensates a digital signal being transmitted by using compensation parameters before transmitting it.

Figure 1:
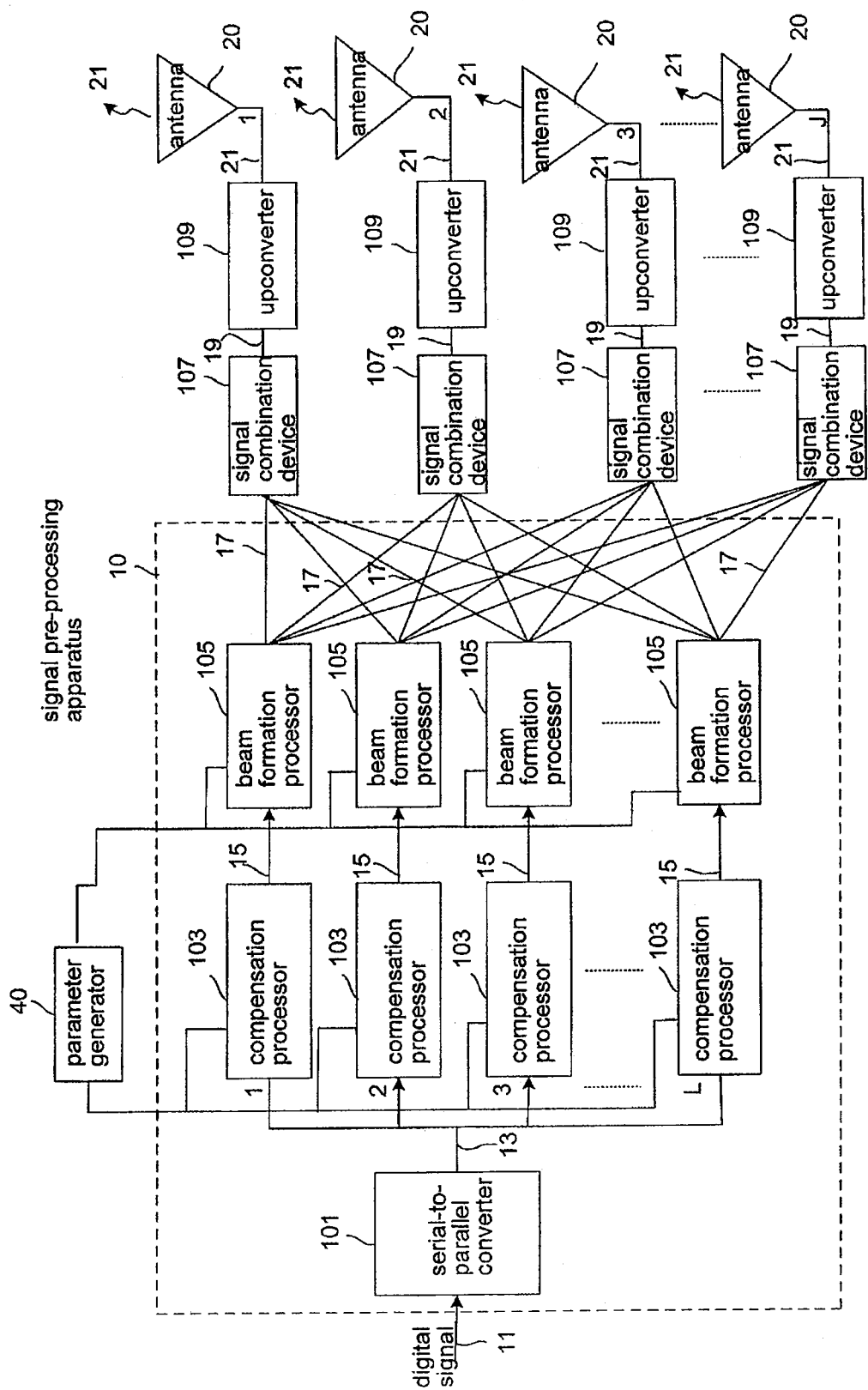
FIG. 1 illustrates the block diagram of the signal pre-processing apparatus of the present invention.

As FIG. 1 shows, the signal pre-processing apparatus 10 of the present invention for a CDMA system receives a digital signal 11 for transmission.

The signal pre-processing apparatus 10 includes a serial-to-parallel converter 101, L compensation processors 103, and L beam formation processors 105.

The serial-to-parallel converter 101 receives and converts the digital signal 11 to N divided signals 13, wherein N is an integer larger than 1. The divided signals 13, denoted as d1, d2, ... dN, are transmitted to each of the L compensation processors 103 in parallel. A parameter generator 40 is configured to estimate the downlink channel status according to the uplink channel characteristics. More specifically, the multiple-user uplink of a CDMA system transmits midambles to the parameter generator 40 to generate compensation parameters that are associated with channel parameters, time parameters and beam parameters. The channel parameters are further associated with L multi-path channel gain parameters and L multi-path arrival time delay parameters. Each of the L compensation processors 103 makes operation of the N divided signals 13 in response to one of the channel parameters and provides a time delay compensation in response to one of the time parameters to generate a compensated signal 15, wherein L is an integer larger than 1. The L compensation processors 103 generate in total L compensated signals 15. Each of the beam formation processors 105, corresponding to one of the compensation processors 103, is configured to receive and intensify the compensated signal 15 to generate an intensified signal 17 in response to one of the beam parameters. The L beam formation processors 105 generate in total L intensified signals 17. It is noted that each of the L beam formation processors 105 has a different beam formation vector, which can generate and assign a space-diversity gain to the corresponding compensated signal 15 to generate L different intensified signals 17. The CDMA system further includes J transmission antennas 20. Each of the transmission antennas includes a signal combination device 107 and an upconverter 109. Each of the J signal combination devices 107 receives the L intensified signals 17 and combines them into a particular signal 19. Each of the J upconverters 109, corresponding to one of the J signal combination devices 107, upconverts the corresponding particular signal 19 into a radio-frequency signal 21. Finally, the J transmission antennas 20 transmit in total J radio-frequency signals 21.

Figure 2:
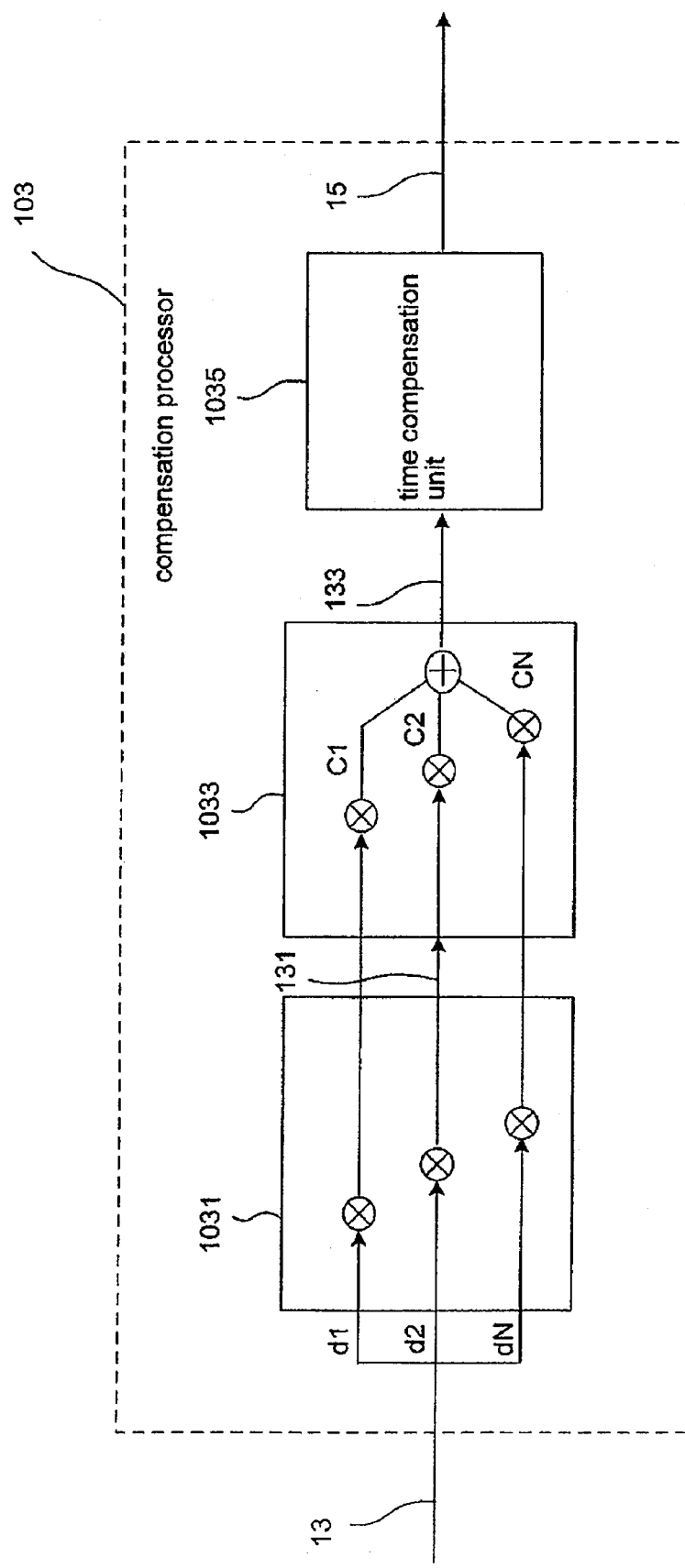
FIG. 2 illustrates the block diagram of the compensation processor of the present invention.

Each of the compensation processors 103, as FIG. 2 shows, includes a channel pre-processing unit 1031, a spectrum spreading unit 1033 and a time compensation unit 1035. The channel pre-processing unit 1031 is configured to pre-compensate possible channel loss when signals go through the downlink channels. It receives and multiplies the N divided signals 13, d1, d2, . . . dN, by one of the multi-path channel gain parameters to obtain N channel gain signals 131. The spectrum spreading unit 1033 is configured to receive and multiply the N channel gain signals 131 by N spreading codes, C1, C2, . . . CN, and then add them together to obtain a spread signal 133. The N spreading codes are diverse and orthogonal to one another, such as Hadamard-Walsh Codes, so when the N channel gain signals 131 are multiplied by the N spreading codes, they do not interfere with one another during transmission. The time compensation unit 1035, receiving one of the multi-path arrival time delay parameters from the parameter generator 40, provides the time delay compensation of the spread signal 133 to form the compensated signal 15. Accordingly, the L spread signals 133 can reach a signal receiving apparatus of the CDMA system at the same time point.

Figure 3:
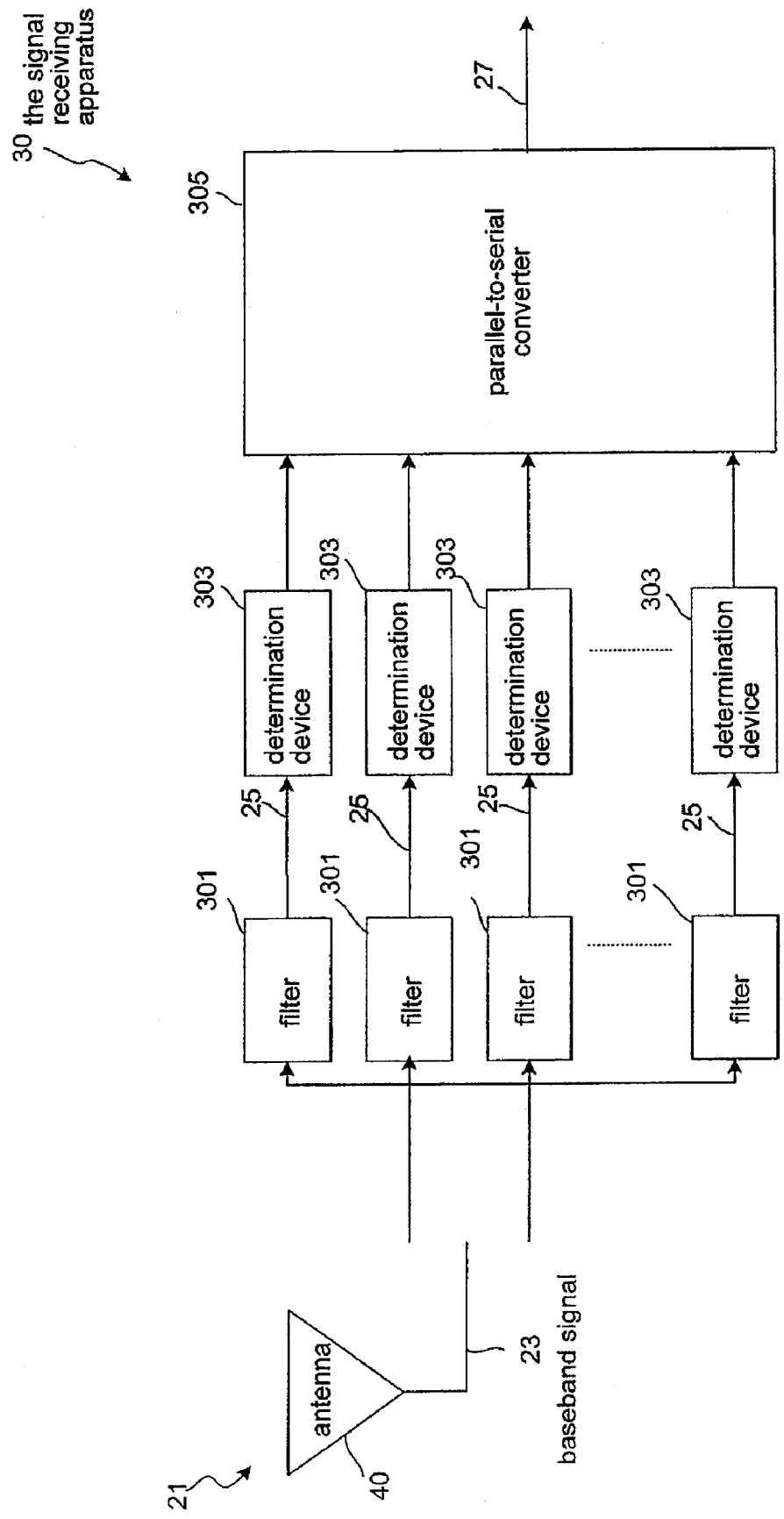
FIG. 3 illustrates the block diagram of the signal receiving apparatus of the present invention.

The present invention further provides a signal receiving apparatus of the CDMA system for receiving the J radio-frequency signals 21. As FIG. 3 shows, the signal receiving apparatus 30 includes a receiving antenna 40, N spreading code match filters 301, N determination devices 303, and a parallel-to-serial converter 305.

The receiving antenna 40 is configured to receive and downconvert the J radio-frequency signals 21 into J baseband signals 23. Each of the N spreading code match filters 301 receives and multiplies the J baseband signals 23 by one of the spreading codes and then filters the results to obtain a main signal 25. Therefore, the N spreading code match filters 301 obtain in total N main signals 25. It is noted that the spreading codes used in the signal receiving apparatus 30 are identical to the spreading codes used in the signal pre-processing apparatus 10. Each of the N determination devices 303, corresponding to one of the N spreading code match filters 301, is configured to determine the value of the corresponding main signal 25. The parallel-to-serial converter 305 is configured to convert the N main signals 25 into the digital signal 27 according to the values of the N main signals 25. The digital signal 27 is the same as the digital signal 11 of the signal pre-processing apparatus 10.

In this preferred embodiment, the digital signal 11 or 27 may be a binary phase shift keying (BPSK) signal or a quadrature phase shift keying (QPSK) signal.

The above description of the preferred embodiment is expected to clearly expound the characteristics of the present invention but not expected to restrict the scope of the present invention. Those skilled in the art will readily observe that numerous modifications and alterations may be made while retaining the teaching of the invention. Accordingly, the above disclosure should be construed as limited only by the bounds of the claims.

We claim:

1. A signal pre-processing apparatus for compensating a digital signal by using compensation parameters before transmitting the digital signal, the compensation parameters being associated with channel parameters, time parameters and beam parameters, the signal pre-processing apparatus comprising:

a serial-to-parallel converter for converting the digital signal to N divided signals, N being an integer larger than 1;

L compensation processors, each of the compensation processors making operation of the N divided signals in response to one of the channel parameters and providing a time delay compensation in response to one of the time parameters to generate a compensated signal, L being an integer larger than 1;

L beam formation processors, each of the beam formation processors, corresponding to one of the compensation processors, being configured to receive and intensify the compensated signal to generate an intensified signal in response to one of the beam parameters, the L beam formation processors totally generating L intensified signals; and J transmission antennas, each of the transmission antennas receiving the L intensified signals and each of the transmission antennas comprising a signal combination device for combining the L intensified signals into a particular signal.

2. The signal pre-processing apparatus of claim 1, wherein the signal pre-processing apparatus is configured for a code division multiple access (CDMA) system.

3. The signal pre-processing apparatus of claim 2, wherein each of the transmission antennas further comprises an upconverter for upconverting the particular signal into a radio-frequency signal, and the J transmission antennas totally generate J radio-frequency signals.

4. The signal pre-processing apparatus of claim 1, wherein the channel parameters are associated with L multi-path channel gain parameters and L multi-path arrival time delay parameters.

5. The signal pre-processing apparatus of claim 4, wherein each of the compensation processors comprises:

a channel pre-processing unit for receiving and multiplying the N divided signals by one of the multi-path channel gain parameters to obtain N channel gain signals;

a spectrum spreading unit for receiving and multiplying the N channel gain signals by N spreading codes and then adding together to obtain a spread signal; and a time compensation unit for providing the time delay compensation of the spread signal in response to one of the multi-path arrival time delay parameters to obtain the compensated signal.

6. The signal pre-processing apparatus of claim 1, wherein the beam parameters comprise L beam formation vectors, and each of the L beam formation vectors, configured for one of the L beam formation processors, generates and assigns a space-diversity gain to the compensated signal to form the intensified signal.

7. The signal pre-processing apparatus of claim 5, wherein the N spreading codes are diverse and orthogonal to one another.

8. The signal pre-processing apparatus of claim 1, wherein the digital signal is one of a binary phase shift keying (BPSK) signal and a quadrature phase shift keying (QPSK) signal.

9. The signal pre-processing apparatus of claim 1, wherein the compensation parameters are obtained by making operation of an uplink signal.

10. The signal pre-processing apparatus of claim 3, the ODMA system further comprising a signal receiving apparatus for receiving the J radio-frequency signals, the signal receiving apparatus comprising:

a receiving antenna for receiving and downconverting the J radio-frequency signals into J baseband signals;

N spreading code match filters, each of the N spreading code match filters receiving and multiplying the J baseband signals by one of the spreading codes and then filtering to obtain a main signal, the N spreading code match filters totally obtaining N main signals;

N determination devices, each of the N determination devices, corresponding to one of the N spreading code match filters, determining a value of the main signal; and a parallel-to-serial converter for converting the N main signals into the digital signal in response to the value of each of the N main signals.

11. A communication system, comprising:

a stationary device for transmitting a digital signal, comprising:

a parameter generator for receiving an uplink signal and deriving compensation parameters associated with channel parameters and beam parameters; and a transmitter, comprising J transmission antennas, for transmitting the digital signal, each of the transmission antennas comprising a signal combination device and an upconverter;

a signal pre-processing apparatus, comprising:

a serial-to-parallel converter for converting the digital signal into N divided signals, N being an integer larger than 1;

L compensation processors, each of the compensation processors making operation of the N divided signals in response to one of the channel parameters and outputting a compensated signal, L being an integer larger than 1; and L beam formation processors, each of the beam formation processors, corresponding to one of the compensation processors, being configured to receive and intensify the compensated signal to generate an intensified signal in response to one of the beam parameters and transmit the intensified signal to the J signal combination devices, the L beam formation processors totally generating L intensified signals, the J signal combination devices respectively combining the L intensified signals to obtain J particular signals and the J upconverters respectively upconverting the J particular signals into J radio-frequency signals for transmission; and a mobile device for receiving the J radio-frequency signals, comprising:

a receiving antenna for receiving and downconverting the J radio-frequency signals to J baseband signals;

N determination modules, each of the determination modules receiving the J baseband signals to obtain a main signal and determining a value of the main signal, the N determination modules totally obtaining N main signals; and a parallel-to-serial converter for converting the N main signals into the digital signal in response to the value of each of the main signals.

12. The communication system of claim 11, wherein the channel parameters are associated with L multi-path channel gain parameters and L multi-path arrival time delay parameters.

13. The communication system of claim 11, wherein each of the compensation processors comprises:

a channel pre-processing unit for receiving and multiplying the N divided signals by one of the multi-path channel gain parameters to obtain N channel gain signals;

a spectrum spreading unit for receiving and multiplying the N channel gain signals by N spreading codes and then adding together to obtain a spread signal; and a time compensation unit for receiving and providing a time delay compensation of the spread signal in response to one of the multi-path arrival time delay parameters to obtain the compensated signal.

14. The communication system of claim 11, wherein the beam parameters comprise L beam formation vectors, and each of the L beam formation vectors, configured for one of the L beam formation processors, generates and assigns a space-diversity gain to the compensated signal to form the intensified signal.

15. The communication system of claim 13, wherein each of the determination modules comprises:

a spreading code match filter for receiving and multiplying the J baseband signals by one of the spreading codes and filtering to obtain the main signal; and a determination device for determining the value of the main signal;

wherein the N spreading codes are diverse and orthogonal to one another.

16. The communication system of claim 11, wherein the digital signal is one of a binary phase shift keying (BPSK) signal and a quadrature phase shift keying (QPSK) signal.

17. The communication system of claim 11, wherein the communication system is a code division multiple access (CDMA) system.

* * * * *